(12) United States Patent
Kirihara et al.

(10) Patent No.: US 8,115,789 B2
(45) Date of Patent: Feb. 14, 2012

(54) DISPLAY CONTROL APPARATUS AND METHOD FOR ENLARGING IMAGE OF CONTENT AND DISPLAYING ENLARGED IMAGE

(75) Inventors: Satoshi Kirihara, Tama (JP); Shuntaro Aratani, Machida (JP); Eiichi Matsuzaki, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 737 days.

(21) Appl. No.: 11/970,472

(22) Filed: Jan. 7, 2008

(65) Prior Publication Data

US 2008/0165191 A1  Jul. 10, 2008

(30) Foreign Application Priority Data

Jan. 10, 2007  (JP) ................................ 2007-002055

(51) Int. Cl.
*G09G 5/02* (2006.01)
(52) U.S. Cl. ........ 345/698; 345/581; 345/619; 345/660; 345/694
(58) Field of Classification Search .................. None
See application file for complete search history.

(56) References Cited

U.S. PATENT DOCUMENTS

| 7,123,294 | B1 * | 10/2006 | Uchikawa | 348/231.2 |
|---|---|---|---|---|
| 7,782,373 | B2 * | 8/2010 | Seo et al. | 348/239 |
| 2005/0174428 | A1 * | 8/2005 | Abe | 348/65 |
| 2007/0025592 | A1 * | 2/2007 | Takeshima et al. | 382/103 |
| 2008/0123925 | A1 * | 5/2008 | Nagatsuka | 382/131 |

FOREIGN PATENT DOCUMENTS

| EP | 1158788 A1 | 11/2001 |
|---|---|---|
| JP | 11-004414 A | 1/1999 |
| JP | 2001-128062 A | 5/2001 |
| JP | 2004173078 A * | 6/2004 |
| JP | 2006-303707 A | 11/2006 |
| WO | WO 2006087895 A1 * | 8/2006 |

* cited by examiner

*Primary Examiner* — Kee M Tung
*Assistant Examiner* — Jwalant Amin
(74) *Attorney, Agent, or Firm* — Canon USA, Inc., I.P. Division

(57) ABSTRACT

An analyzer of a display control apparatus analyzes image characteristics of an image that has been pixel-converted by a pixel converter. A number-of-pixels determining unit compares the analysis result obtained by the analyzer with predetermined deterioration determination thresholds and determines the number of display pixels that is optimal for content. A pixel converter converts the number of pixels of the content into the determined optimal number of display pixels.

10 Claims, 16 Drawing Sheets

| STORED CONTENT NO. | STORAGE DATE | CONTENT LENGTH |
|---|---|---|
| 1 | 7/4/2006 | 1h32m10s |
| 2 | 7/5/2006 | 32m00s |
| 3 | 7/6/2006 | 1h00m5s |
| 4 | 7/7/2006 | 1h15m30s |

FIG. 7

| DCT COEFFICIENT POSITION | DETERIORATION DETERMINATION THRESHOLD |
|---|---|
| a11 | 56000 |
| a12 | 48000 |
| a13 | 32000 |
| a14 | 12000 |
| a15 | 4200 |
| a16 | 400 |
| a17 | 80 |
| a18 | 20 |
| a21 | 49000 |
| a22 | 29000 |
| ... | ... |
| a83 | 100 |
| a84 | 80 |
| a85 | 50 |
| a86 | 40 |
| a87 | 10 |
| a88 | 5 |

FIG. 8

| STORED CONTENT NO. | ANALYSIS ACCURACY P(n) | OPTIMAL NUMBER OF DISPLAY PIXELS (X × Y) |
|---|---|---|
| 1 | MAX | 1920 × 1080 |
| 2 | MAX | 2304 × 1296 |
| 3 | 8 | 1536 × 864 |
| 4 | 2 | 1152 × 648 |

FIG. 9

| STORED CONTENT NO. | ANALYSIS ACCURACY P(n) | OPTIMAL NUMBER OF DISPLAY PIXELS (X × Y) | USER-SPECIFIED NUMBER OF DISPLAY PIXELS |
|---|---|---|---|
| 1 | MAX | 1920 × 1080 | NONE |
| 2 | MAX | 2304 × 1296 | NONE |
| 3 | 8 | 1536 × 864 | 2304 × 1295 |
| 4 | 2 | 1152 × 648 | NONE |

FIG. 11

| DCT COEFFICIENT POSITION | PREDICTED DETERIORATION RATE |
|---|---|
| a11 | 0.98 |
| a12 | 0.98 |
| a13 | 0.98 |
| a14 | 0.97 |
| a15 | 0.95 |
| a16 | 0.94 |
| a17 | 0.91 |
| a18 | 0.88 |
| a21 | 0.98 |
| a22 | 0.97 |
| ... | ... |
| a83 | 0.92 |
| a84 | 0.91 |
| a85 | 0.91 |
| a86 | 0.88 |
| a87 | 0.88 |
| a88 | 0.81 |

FIG. 14A

| DISPLAY UNIT 19A | |
|---|---|
| NUMBER OF PIXELS IN HORIZONTAL DIRECTION | 7680 |
| NUMBER OF PIXELS IN VERTICAL DIRECTION | 4320 |
| SIZE IN HORIZONTAL DIRECTION (cm) | 328 |
| SIZE IN VERTICAL DIRECTION (cm) | 182 |
| DCT COEFFICIENT POSITION | DETERIORATION DETERMINATION THRESHOLD |
| a11 | 56000 |
| a12 | 48000 |
| a13 | 32000 |
| a14 | 12000 |
| a15 | 4200 |
| a16 | 400 |
| a17 | 80 |
| a18 | 20 |
| a21 | 49000 |
| a22 | 29000 |
| ... | ... |
| a83 | 100 |
| a84 | 80 |
| a85 | 50 |
| a86 | 40 |
| a87 | 10 |
| a88 | 5 |

FIG. 14B

| DISPLAY UNIT 19B | |
|---|---|
| NUMBER OF PIXELS IN HORIZONTAL DIRECTION | 7680 |
| NUMBER OF PIXELS IN VERTICAL DIRECTION | 4320 |
| SIZE IN HORIZONTAL DIRECTION (cm) | 459 |
| SIZE IN VERTICAL DIRECTION (cm) | 258 |
| DCT COEFFICIENT POSITION | DETERIORATION DETERMINATION THRESHOLD |
| a11 | 57680 |
| a12 | 49440 |
| a13 | 32960 |
| a14 | 12360 |
| a15 | 4326 |
| a16 | 412 |
| a17 | 82 |
| a18 | 21 |
| a21 | 50470 |
| a22 | 29870 |
| ... | ... |
| a83 | 103 |
| a84 | 82 |
| a85 | 52 |
| a86 | 41 |
| a87 | 10 |
| a88 | 5 |

FIG. 14C

| DISPLAY UNIT 19C | |
|---|---|
| NUMBER OF PIXELS IN HORIZONTAL DIRECTION | 3840 |
| NUMBER OF PIXELS IN VERTICAL DIRECTION | 2160 |
| SIZE IN HORIZONTAL DIRECTION (cm) | 285 |
| SIZE IN VERTICAL DIRECTION (cm) | 160 |
| DCT COEFFICIENT POSITION | DETERIORATION DETERMINATION THRESHOLD |
| a11 | 58800 |
| a12 | 50400 |
| a13 | 33600 |
| a14 | 12600 |
| a15 | 4410 |
| a16 | 420 |
| a17 | 84 |
| a18 | 21 |
| a21 | 51450 |
| a22 | 30450 |
| ... | ... |
| a83 | 105 |
| a84 | 84 |
| a85 | 53 |
| a86 | 42 |
| a87 | 11 |
| a88 | 5 |

FIG. 16

| | |
|---|---|
| id (INFORMATION INDICATING THIS IS OPTIMAL-NUMBER-OF-DISPLAY-PIXELS HEADER) | 32 bits |
| h_res_opt (NUMBER OF DISPLAY PIXELS IN HORIZONTAL DIRECTION) | 32 bits |
| v_res_opt (NUMBER OF DISPLAY PIXELS IN VERTICAL DIRECTION) | 32 bits |
| h_res_monitor (NUMBER OF PIXELS OF DISPLAY IN HORIZONTAL DIRECTION) | 32 bits |
| v_res_monitor (NUMBER OF PIXELS OF DISPLAY IN VERTICAL DIRECTION) | 32 bits |
| h_siz_monitor (SIZE OF DISPLAY IN HORIZONTAL DIRECTION) | 32 bits |
| v_siz_monitor (SIZE OF DISPLAY IN VERTICAL DIRECTION) | 32 bits |
| scaling_alg (PIXEL CONVERSION ALGORITHM) | 8 bits |

DISPLAY CONTROL APPARATUS AND METHOD FOR ENLARGING IMAGE OF CONTENT AND DISPLAYING ENLARGED IMAGE

BACKGROUND OF THE INVENTION

1. Field of the Invention

The present invention relates to display control apparatuses and methods for displaying an enlarged image.

2. Description of the Related Art

In current digital television broadcasting, standard definition (SD) content and high definition (HD) content are mixed. SD content is, for example, content having 720×480 pixels. HD content is, for example, content having 1280×720 or 1920 (1440)×1080 pixels. SD content and HD content are also mixed in storage media including digital versatile discs (DVDs), Internet broadcasting, video on demand (VOD), and the like.

A display capable of displaying SD content includes, for example, a display having 720×480 pixels. A display capable of displaying HD content includes, for example, a display having 1280×720 pixels or a display having 1920×1080 pixels. In recent years, an increasing number of HD-capable displays have been used.

Methods of displaying SD content on an HD-capable display can be roughly grouped into two types. The first type involves performing pixel conversion of SD content into the number of pixels of the HD-capable display and displaying an enlarged image of the SD content on the entire screen of the HD-capable display. The second type involves no pixel conversion of SD content and displays an image of the SD content on part of the screen of the HD-capable display.

Japanese Patent Laid-Open No. 11-4414 discloses a method of converting an SD image into an HD image. According to this method, an HD image corresponding to an original SD image is generated by performing a genetic operation. The HD image generated is converted into a second SD image which is then compared with the original SD image to evaluate the validity of the conversion result.

Research and development of content called "super hi-vision" having a higher resolution than HD and displays therefor have been conducted primarily by Nippon Hoso Kyokai (NHK) Science and Technical Research Laboratories. The image format of super high-vision content (hereinafter referred to as "SHV content") is 7680×4320 (8 k×4 k) pixels. Digital cinemas having an image format of 4 k×2 k pixels have also been developed. An expected SHV-capable display includes, for example, a display having 7680×4320 (8 k×4 k) pixels and a display having 4096×2160 (4 k×2 k) pixels.

The number of pixels in HD content having 1920×1080 pixels is approximately six times greater than the number of pixels in SD content having 720×480 pixels. In contrast, the number of pixels in SHV content having 7680×4320 (8 k×4 k) is approximately 96 times greater than the number of pixels in SD content having 720×480 pixels. In the case where an enlarged image of SD content is displayed on the entire screen of the SHV-capable display having 8 k×4 k pixels, image quality is deteriorated when conventional pixel conversion is used. In contrast, in the case where an image of SD content is displayed without performing pixel conversion on the screen of the SHV-capable display having 8 k×4 k pixels, the image is displayed in only about one ninety-sixth of the area of the screen of the SHV-compliant display. Similarly, in the case where an image of SD content is displayed on a display having 4 k×2 k pixels, the image is displayed in only about one twenty-fourth of the area of the screen. In these cases, the displayed image likely will be unsatisfactory to a typical user.

In order to overcome these problems, it is desirable to display an image with the number of display pixels that is optimal for content (for example, the maximum number of display pixels with acceptable deterioration of image quality characteristics). In general, however, the number of pixels in the displayed images has conventionally either been implemented crudely or a user has been required to set the number of display pixels. No method of computing the number of display pixels that is optimal for content heretofore has been proposed.

Japanese Patent Laid-Open No. 11-4414 discloses a method of converting an SD image into an HD image. However, it does not describe the method of computing the number of display pixels that is optimal for content and then performing pixel conversion.

SUMMARY OF THE INVENTION

The present invention provides a display control apparatus and method for enlarging an image of content and displaying the enlarged image with the optimal number of display pixels.

According to one aspect of the present invention, a display control apparatus for displaying on a display unit an enlarged image that represents an enlargement of an image of content, wherein the display unit has a number of pixels greater than a number of pixels of the content, includes: an analyzer configured to analyze an image characteristic of the enlarged image; a number-of-pixels determining unit configured to determine a number of display pixels of the enlarged image so that the image characteristic analyzed by the analyzer satisfies a predetermined determination criterion; and a pixel converter configured to perform pixel conversion of the image of the content to generate the enlarged image, the enlarged image having the number of display pixels determined by the number-of-pixels determining unit, and to output the enlarged image to the display unit.

According to another aspect of the present invention, a display control method of displaying on a display unit an enlarged image that represents enlargement of an image of content, wherein the display unit has a number of pixels greater than a number of pixels of the content, includes: analyzing an image characteristic of the enlarged image; determining a number of display pixels of the enlarged image so that the image characteristic satisfies a predetermined determination criterion; and performing pixel conversion of the image of the content to generate the enlarged image, the enlarged image having the number of display pixels, and outputting the enlarged image to the display unit.

According to an aspect of the present invention, an image of content can be enlarged and displayed with the optimal number of pixels by analyzing a characteristic of the image of the content. Analysis may alternatively be performed on the content instead of the enlarged image, and the number of display pixels may alternatively be determined so that an image characteristic of the enlarged image satisfies a predetermined determination criterion using the image characteristic of the content, a predicted deterioration rate obtained by predicting a rate of deterioration of the image characteristic of the enlarged image that will occur when the image of the content is enlarged, and the predetermined determination criterion.

Further features of the present invention will become apparent from the following description of exemplary embodiments with reference to the attached drawings.

BRIEF DESCRIPTION OF THE DRAWINGS

FIG. 7 is a table of exemplary pre-stored deterioration determination thresholds contained in a threshold storage unit shown in FIG. 1.

FIG. 8 is a table of exemplary optimal numbers of pixels stored in a number-of-pixels storage unit shown in FIG. 1.

FIG. 9 is a table of the optimal-number-of-display-pixel information and additional user-specified number-of-display-pixel information.

FIG. 11 is a table of exemplary pre-stored predicted-deterioration-rate information contained in a predicted-deterioration-rate storage unit shown in FIG. 10.

FIGS. 14A, 14B, and 14C illustrate exemplary deterioration determination thresholds in tabular form for a multiple types of display units.

FIG. 16 is a table of exemplary header information added to content.

DESCRIPTION OF THE EMBODIMENTS

First Exemplary Embodiment

Figure 1:
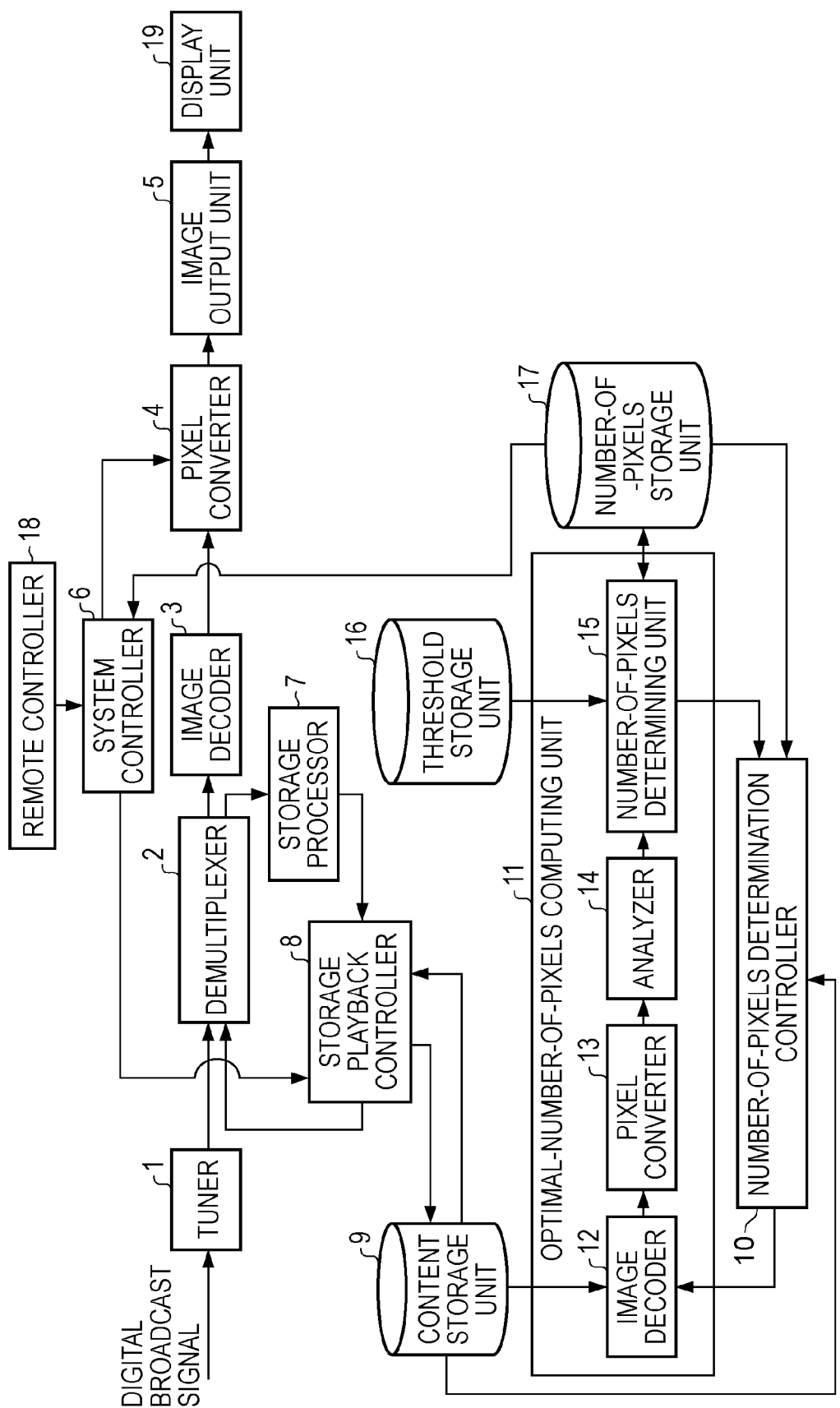
FIG. 1 is a block diagram of the schematic structure of a display control apparatus according to a first exemplary embodiment of the present invention.

Various exemplary embodiments, features, and aspects of the present invention are additionally described below in great detail with references to the drawings. FIG. 1 is a block diagram of the schematic structure of a display control apparatus according to a first exemplary embodiment of the present invention. In the description of the present embodiment, it is assumed that digital television broadcast content is viewed, although other forms of content may alternatively be used. The assumed transmission format is the Transport Stream (TS) of the Moving Picture Experts Group (MPEG)-2, although other formats may alternative be used in accordance with the present invention.

Referring to FIG. 1, the display control apparatus includes a tuner 1, a demultiplexer 2, an image decoder 3, a pixel converter 4, an image output unit 5, a system controller 6, a storage processor 7, a storage playback controller 8, and a content storage unit 9. The display control apparatus also includes a number-of-pixels determination controller 10, an optimal-number-of-pixels computing unit 11, an image decoder 12, a pixel converter 13, an analyzer 14, a number-of-pixels determining unit 15, a threshold storage unit 16, a number-of-pixels storage unit 17, and a remote controller 18. Also shown is a display unit 19 which may be of conventional (or alternatively other) design.

Digital broadcast signals received by an antenna (not shown) are input to the tuner 1. The digital broadcast signals include those received via a cable television network and those received via the Internet.

The tuner 1 selects a signal of a user's desired channel from among the input digital broadcast signals, applies decoding processing on the selected signal, and outputs the decoded signal, which is an MPEG-2 TS signal, to the demultiplexer 2. The demultiplexer 2 demultiplexes the multiplexed TS signal into an image signal (MPEG-2 video signal) and an audio signal (MPEG-2 audio signal), for example, and outputs the image signal and the audio signal. The image signal output from the demultiplexer 2 is supplied to the image decoder 3. The audio signal output from the demultiplexer 2 is supplied to an audio decoder (not shown). Audio decoding may be implemented, for example, in conventional manner. The form of audio decoding is not important to the invention.

The image decoder 3 decodes the image signal supplied from the demultiplexer 2 and outputs the decoded image signal. The pixel converter 4 performs pixel conversion of the image signal output from the image decoder 3 to convert the image signal into an image with the number of display pixels specified by the system controller 6. An arbitrary method, such as the bicubic algorithm or other conventional method, may be used as the pixel conversion algorithm. The image output unit 5 outputs the image signal that has been pixel-converted by the pixel converter 4 to the display unit 19.

From the TS signal output from the tuner 1, the demultiplexer 2 extracts a signal of content to be stored and supplies the extracted signal to the storage processor 7. The storage processor 7 shapes packets of the content to be stored and adds stored content information, such as the content number, storage date, and content length, to the content.

Figures 2, 3:
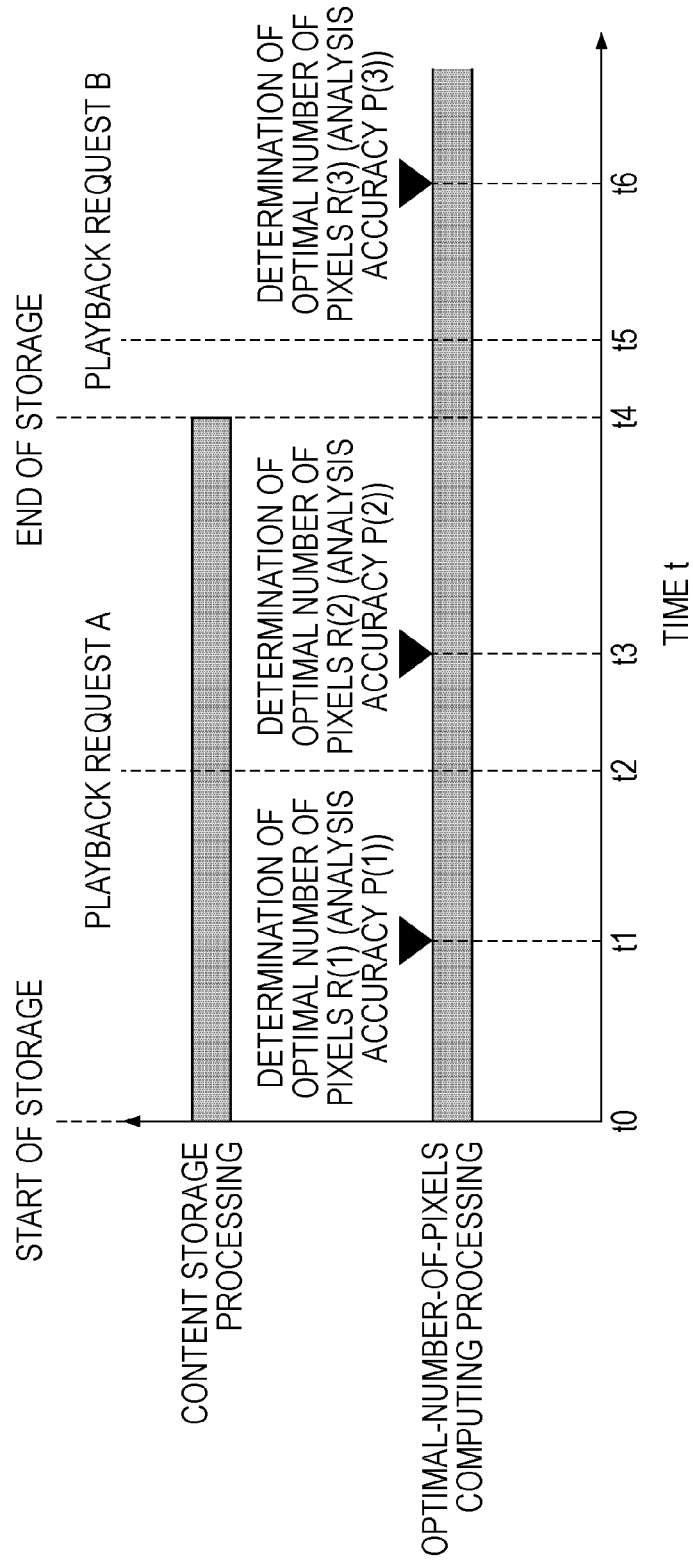
FIG. 2 is a table representing exemplary stored content information added to content.
FIG. 3 is a chart for describing a process of computing the optimal number of display pixels while increasing the analysis accuracy increment by increment.

FIG. 2 is a table representing exemplary stored content information added to pieces of content having content numbers 1 to 4. Referring to FIG. 2, stored content information includes "stored content number", "storage date", and "content length". For example, in FIG. 2, content information corresponding to stored content number 1 includes a storage date of Jul. 4, 2006 and a content length of 1 hour 32 minutes 10 seconds (1 h 32 m 10 s).

Referring back to FIG. 1, upon receipt of a storage request from the system controller 6, the storage playback controller 8 stores content output from the storage processor 7 into the content storage unit 9. Upon receipt of a playback instruction from the system controller 6, the storage playback controller 8 reads the content stored in the content storage unit 9 and supplies the read content to the demultiplexer 2.

The number-of-pixels determination controller 10 controls the operation of the optimal-number-of-pixels computing unit 11 based on the stored content information supplied from the content storage unit 9. The optimal-number-of-pixels computing unit 11 computes the number of display pixels that is optimal for content. The optimal-number-of-pixels computing unit 11 includes the image decoder 12, the pixel converter 13, the analyzer 14, and the number-of-pixels determining unit 15. In the present embodiment of the invention, the optimal number of display pixels refers to the maximum number of display pixels at which deterioration of characteristics of an enlarged image does not become higher than or equal to a specified level. Because characteristics of an image of content may be deteriorated by performing pixel conversion of the image to enlarge the image, the number of display pixels at which image characteristics do not become worse than a specified level is determined in accordance with the present invention.

The image decoder 12 extracts an arbitrary frame from an image signal of content stored in the content storage unit 9 and decodes the extracted frame. The pixel converter 13 performs pixel conversion of the image signal decoded by the image decoder 12. The analyzer 14 analyzes the result of pixel conversion performed by the pixel converter 13. The threshold storage unit 16 contains pre-stored deterioration determination thresholds (determination criterion values) for determining the degree of deterioration of image characteristics. The number-of-pixels determining unit 15 compares the analysis result obtained by the analyzer 14 with a corresponding one of the deterioration determination thresholds obtained from the threshold storage unit 16 and determines the number of display pixels that is optimal for content. A process of determining the number of display pixels that is optimal for content using the number-of-pixels determination controller 10 and the optimal-number-of-pixels computing unit 11 will be described later.

The number-of-pixels storage unit 17 retains the number of display pixels determined by the number-of-pixels determining unit 15. The number-of-pixels storage unit 17 also stores in advance the number of pixels of the display unit 19. The system controller 6 obtains the number-of-pixels information retained in the number-of-pixels storage unit 17 and sets this information in the pixel converter 4. In response to a remote control signal from the remote controller 18, the system controller 6 controls the operation of the storage playback controller 8.

Although two image decoders 3 and 12 and two pixel converters 4 and 13 are provided in the structure shown in FIG. 1, the structure may include only one image decoder 3 and one pixel converter 4. In this case, the image decoder 3 and the pixel converter 4 are also used in computing the optimal number of display pixels, and the result of pixel conversion performed by the pixel converter 4 is analyzed by the analyzer 14.

In the present embodiment according to the invention, the process of determining the number of display pixels that is optimal for content includes computing the optimal number of display pixels while increasing the analysis accuracy increment by increment. Accordingly, upon request for playing stored content, an image of the content can be enlarged using the optimal number of display pixels computed with the analysis accuracy available at that time and the enlarged image can be displayed.

FIG. 3 is a chart for describing a process of determining the optimal number of display pixels while increasing the analysis accuracy increment by increment. In this chart, the storage of content starts at time t0 and ends at time t4.

Referring to FIGS. 1 and 3, after the storage of content starts at time t0, the optimal-number-of-pixels computing unit 11 computes the number of display pixels that is optimal for the content while increasing the analysis accuracy increment by increment. More specifically, arithmetic processing is performed at time t1 with analysis accuracy $P(1)$, and the number of display pixels $R(1)$ that is optimal for the content stored in a period from time t0 to t1 is computed. Thereafter, arithmetic processing is performed at time t3 with analysis accuracy $P(2)$, which is one increment higher than analysis accuracy $P(1)$, and the number of display pixels $R(2)$ that is optimal for the content stored in a period from t0 to t3 is computed. Thereafter, arithmetic processing is performed at time t6 with analysis accuracy $P(3)$, which is one increment higher than analysis accuracy $P(2)$, and the number of display pixels $R(3)$ that is optimal for the content stored in a period from t0 to t4 is computed.

When a user operates the remote controller 18 at time t2 and makes a time-shift playback request for the content being stored (playback request A), the system controller 6 instructs the storage playback controller 8 to play the content. The system controller 6 obtains from the number-of-pixels storage unit 17 that optimal number of display pixels $R(1)$, which has been computed by that time and sets that optimal number of display pixels $R(1)$ in the pixel converter 4. Content played by the storage playback controller 8 is processed by the demultiplexer 2 and image decoder 3 and then pixel-converted to the optimal number of display pixels $R(1)$ by the pixel converter 4, resulting in an enlarged image that is displayed on the display unit 19. When the user makes a time-shift playback request for stored content (playback request B) at time t5, the content played by the storage playback controller 8 is processed by the demultiplexer 2 and image decoder 3 and then pixel-converted by the pixel converter 4 to that optimal number of display pixels $R(2)$ which has been computed by that time, resulting in an enlarged image that is displayed on the display unit 19. In this manner, the optimal number of display pixels is computed while increasing the analysis accuracy increment by increment. Therefore, an enlarged image of stored content having that optimal number of display pixels that has been computed by the time a playback request for the content is made can be displayed on the display unit 19.

Figure 4:
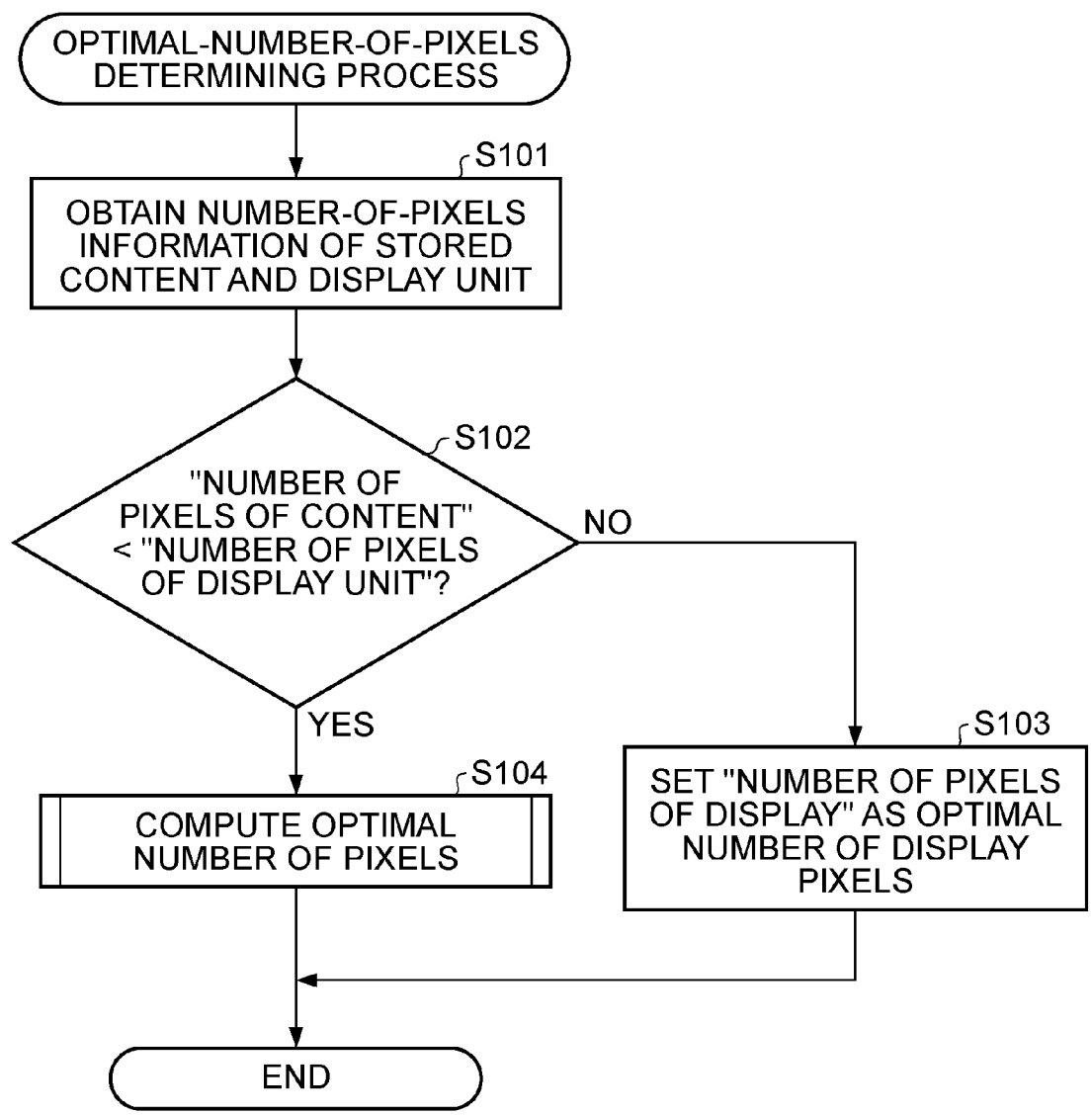
FIG. 4 is a first flowchart of a process of determining the optimal number of display pixels.

A process of determining the number of display pixels that is optimal for content will now be described. FIG. 4 is a first flowchart of a process of determining the optimal number of display pixels. Referring to FIGS. 1 and 4, the process of determining the number of display pixels that is optimal for content using the number-of-pixels determination controller 10 and the optimal-number-of-pixels computing unit 11 will be described.

In step S101, the number-of-pixels determination controller 10 analyzes content stored in the content storage unit 9 and obtains the number of pixels of the stored content. Also, the number-of-pixels determination controller 10 reads the number-of-pixels information of the display unit 19 from the number-of-pixels storage unit 17. In step S102, the number-of-pixels determination controller 10 determines whether the number of pixels of the content is less than the number of pixels of the display unit 19. In this exemplary embodiment, the number-of-pixels information of the display unit 19 is set in advance in the number-of-pixels determination controller 10. When the number of pixels of the content is greater than or equal to the number of pixels of the display unit 19 (NO in step S102), the flow proceeds to step S103, wherein the number-of-pixels determining unit 15 determines the number of pixels of the display unit 19 as the number of display pixels that is optimal for the content, and the process ends. In contrast, when the number of pixels of the content is less than the number of pixels of the display (YES in step S102), the flow proceeds from step S102 to step S104, wherein the optimal-number-of-pixels computing unit 11 computes the number of display pixels that is optimal for the content, and the process ends.

Figure 5:
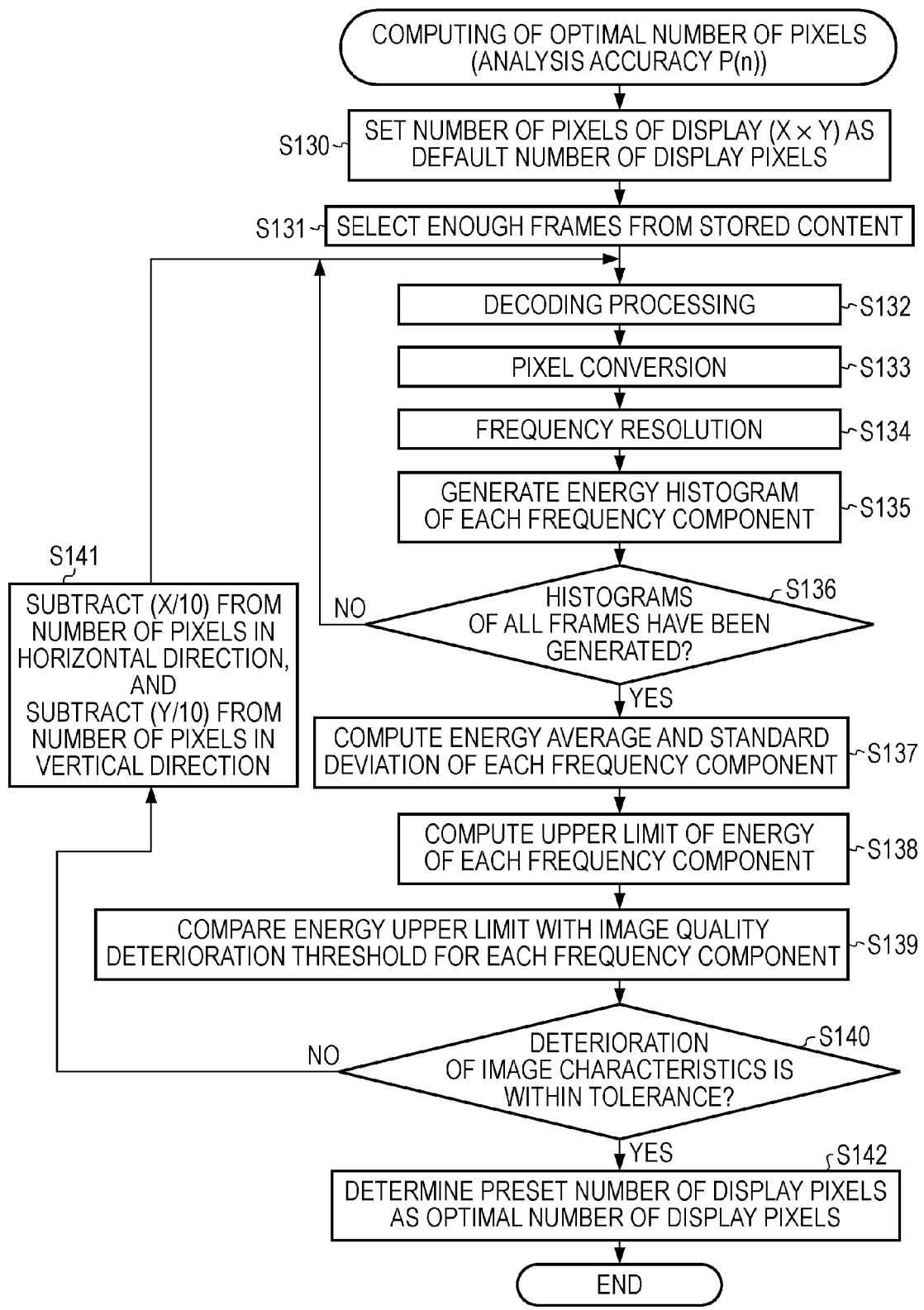
FIG. 5 is a second flowchart of the process of determining the optimal number of display pixels.

FIG. 5 is a second flowchart of the process of determining the optimal number of display pixels. FIG. 5 shows the details of step S104 shown in FIG. 4 in which the optimal number of display pixels is computed. Here, arithmetic processing is performed with analysis accuracy $P(n)$. According to the present embodiment, analysis accuracy $P(n)$ is increased increment by increment by increasing the number of frames for use in analyzing the image of the content increment by increment.

Referring to FIGS. 1 and 5, in step S130, the number-of-pixels determining unit 15 reads the number of pixels (X×Y) of the display unit 19 from the number-of-pixels storage unit 17 and sets the number as a default number of display pixels. Here, X denotes the number of pixels in the horizontal direction, and Y denotes the number of pixels in the vertical direction. In step S131, the number-of-pixels determination controller 10 selects from the content stored in the content storage unit 9 enough frames so that arithmetic processing with analysis accuracy P(n) can be performed. The frames may be selected at random or may be selected at predetermined intervals. The number of frames necessary for performing arithmetic processing with analysis accuracy P(n) may be $2^n$, for example, but is not limited thereto. For higher analysis accuracy, more frames may be used in performing arithmetic processing. Merely for purposes of explaining an embodiment of the invention, the selected number of frames is assumed in this example to be $2^n$.

In step S132, the image decoder 12 obtains images of the selected $2^n$ frames from the content stored in the content storage unit 9 and decodes these images. In step S133, the pixel converter 13 performs pixel conversion of the images of the frames that have been decoded by the image decoder 12 into the preset number of display pixels (X×Y) and outputs the pixel-converted images to the analyzer 14.

In step S134, the analyzer 14 decomposes the pixel-converted images of the selected frames into spatial frequency components using an orthogonal transformation algorithm, such as the discrete cosine transform (DCT) algorithm. This process may be referred to as spatial frequency resolution. In step S135, DCT coefficients obtained by performing the spatial frequency resolution are squared to generate an energy histogram of each frequency component.

Figure 6:
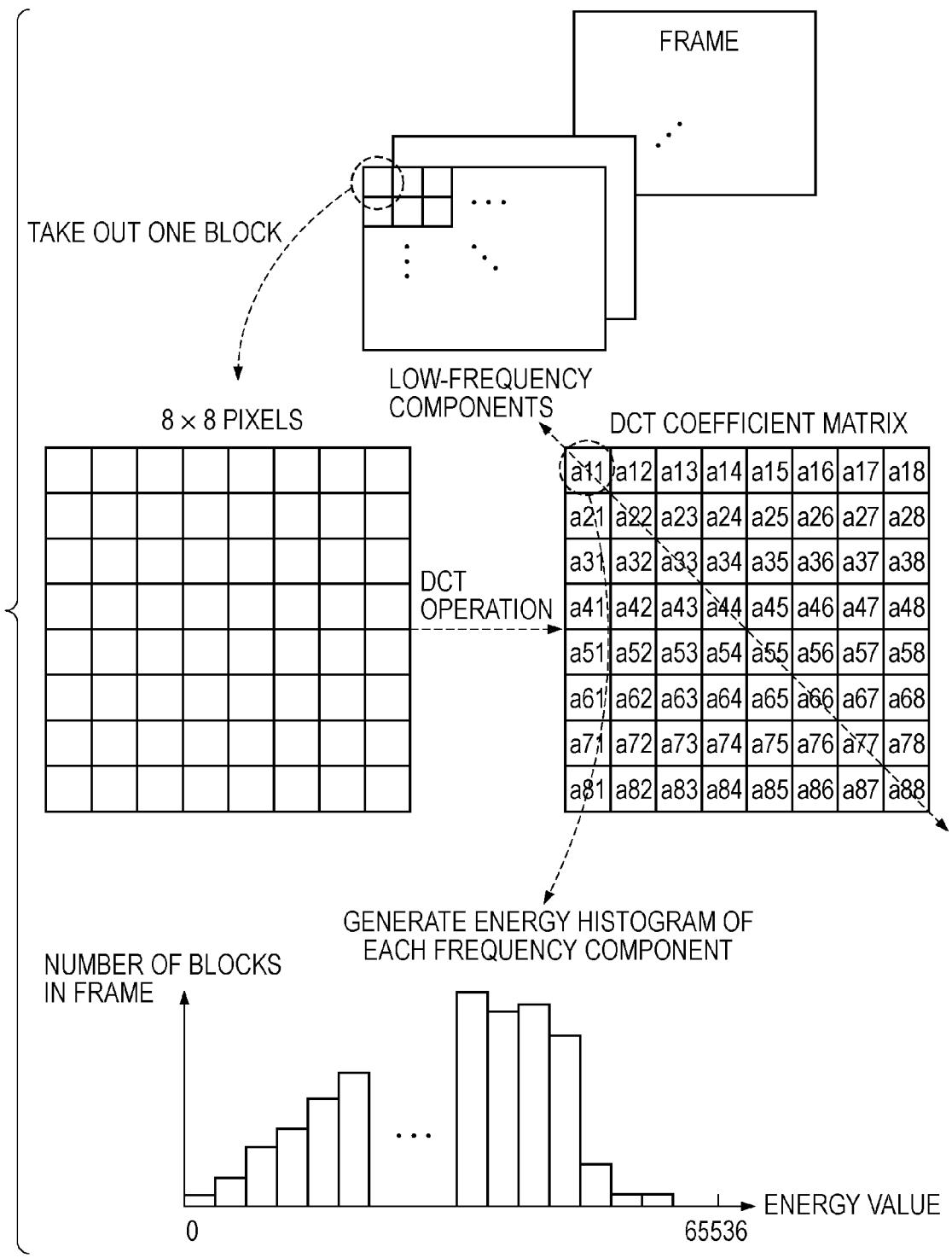
FIG. 6 illustrates the operation of an analyzer shown in FIG. 1.

FIG. 6 illustrates a process of performing spatial frequency resolution and generating a histogram using the analyzer 14. As shown in FIG. 6, an image of each frame is divided into a plurality of blocks, and DCT arithmetic processing is performed on each of the blocks. Although the block size is arbitrary, it is preferable that the block size be approximately 8×8 pixels, which is generally used in MPEG. Spatial frequency resolution of each block is performed using the DCT arithmetic processing, thereby obtaining DCT coefficients of corresponding frequency components. The DCT is well understood in the art. Any conventional method for computing the DCT may be used, for example. Since a known technique is used to perform the DCT arithmetic processing in this embodiment of the present invention, further description thereof is omitted. Referring to FIG. 6, DCT coefficient positions corresponding to frequency components in an 8×8 matrix of DCT coefficients are represented by a11 to a88. The analyzer 14 takes a square of the DCT coefficient of each frequency component, thereby obtaining energy values at the DCT coefficient positions a11 to a88. Energy values of the blocks of the frame are collected to generate an energy histogram in which the energy values are plotted in abscissa and the number of blocks corresponding to each energy value is plotted in ordinate.

Referring again to FIG. 5, when the generation of the energy histograms for all the selected frames is completed, the flow proceeds from step S136 to step S137. In step S137, the analyzer 14 computes the energy average and the energy standard deviation α of each frequency component from the energy histograms for all the selected frames, and an energy average and energy standard deviation has been generated for each frequency component. Thereafter, in step S138, an upper limit (energy upper limit) of a range containing 95% of the energy values is obtained by computing (energy average+2× α) based on the computed energy average and the energy standard deviation α of each frequency component.

In step S139, the number-of-pixels determining unit 15 compares the energy upper limit of each frequency component, which has been computed by the analyzer 14, with a corresponding one of the deterioration determination thresholds stored in the threshold storage unit 16. The threshold storage unit 16 contains the pre-stored deterioration determination thresholds corresponding to the respective frequency components. The deterioration determination thresholds may be determined, for example, using an evaluation experiment or the like. These deterioration determination thresholds (determination criterion values) are thresholds indicating the border of user tolerance of image characteristic deterioration caused by pixel conversion. FIG. 7 illustrates exemplary deterioration determination thresholds corresponding to respective frequency components at some of the DCT coefficient positions a11 to a88 in the DCT coefficient matrix shown in FIG. 6.

Referring back to FIG. 5, in step S140, the number-of-pixels determining unit 15 determines whether the deterioration of image characteristics is within the tolerance. More specifically, it is determined whether the energy upper limits of all the frequency components are greater than or equal to the respective deterioration determination thresholds. When the image characteristics are deteriorated beyond the tolerance (NO in step S140), that is, more specifically, when the energy upper limit of at least one frequency component is less than a corresponding one of the deterioration determination thresholds, the flow proceeds from step S140 to step S141. Alternatively, the flow may proceed from step S140 to step S141 in the case where the upper limits of a predetermined number of frequency components are less than corresponding deterioration determination thresholds.

This deterioration determination processing is based, for example, on a model wherein the more the image characteristics deteriorate, the smaller the energy value of each frequency component becomes. However, another model may alternatively be used, for example, in which the more the image characteristics deteriorate, the smaller the energy values of only high frequency components become. Therefore, deterioration determination may be performed using only the energy values of high frequency components. For example, the energy values corresponding to the DCT coefficient positions a15 to a17, a25 to a27, a35 to a37, a45 to a47, a51 to a57, a61 to a67, and a71 to a77 may be used.

In step S141, the number of pixels in the horizontal direction is reduced by (X/10), and the number of pixels in the vertical direction is reduced by (Y/10), thereby temporarily changing the preset number of display pixels. Here, (X/10) refers, for example, to the largest integer less than or equal to X/10. Although the degree of change in the preset number of display pixels is arbitrary; it is preferable that the aspect ratio of the original image should not be changed. From step S141, processing continues in step S132, and another iteration of the processing of steps S132 through S140 is performed. The processing in steps S132 through S141 is repeated until the deterioration of the image characteristics falls within the tolerance.

In contrast, where the deterioration of the image characteristics is within the tolerance (YES in step S140), the flow proceeds from step S140 to step S142, and the current value of the preset number of display pixels is determined as the optimal number of display pixels. The determined optimal number of display pixels is stored as the optimal number of display pixels corresponding to the analysis accuracy P(n) in the number-of-pixels storage unit 17. The foregoing processing is performed increment by increment in the order of analysis accuracy P(1), P(2), P(3), . . . . The preset number of display pixels is reset to its original value each time the process illustrated in FIG. 5 is reinitiated, for example, for each increment. The number of times the analysis accuracy P(n) is increased increment by increment is set in advance as the upper limit (MAX).

FIG. 8 illustrates exemplary optimal numbers of display pixels stored in the number-of-pixels storage unit 17. FIG. 8 illustrates the optimal number of display pixels calculated for four pieces of stored content in the case where the number of pixels of a display is 3640×2160.

In the present embodiment, the case in which the number of pixels of a display (X×Y) serves as the default number of display pixels has been described. However, in the case of n≧2, the optimal number of display pixels R(n−1) computed by the arithmetic processing using the analysis accuracy P (n−1) may alternatively serve as the default.

As has been described above, in the process of determining the number of display pixels that is optimal for content, the number of display pixels that is optimal for the content is computed while increasing the analysis accuracy increment by increment. Accordingly, when the user makes a request to play the stored content at an arbitrary time, an enlarged image of the content can be displayed on the display using the optimal number of display pixels that has been computed with the analysis accuracy available at that time.

Although the case in which an image of stored content is pixel-converted and an enlarged image thereof is displayed has been described, similar advantages can be achieved where an image of content (recorded on a video tape, an optical disk, or the like) is pixel-converted and an enlarged image thereof is displayed.

Although the case in which the deterioration of the image characteristics is determined based on the frequency components of the image has been described, the deterioration of the image characteristics alternatively may be determined based on the sharpness, color reproducibility, grayscale level reproducibility, noise components, or the like.

The optimal number of display pixels determined by the number-of-pixels determining unit 15 may be changed to any number by the user. For example, the user can operate the remote controller 18 to display a menu for changing the preset optimal number of display pixels. This allows the user can change the number of pixels in the horizontal direction and the number of pixels in the vertical directions to any numbers. FIG. 9 illustrates the case in which user-specified number-of-display-pixel information is added to the optimal number of display pixel information stored in the number-of-pixels storage unit 17. Referring to FIG. 9, user-specified number of display-pixel information (2304×1295) is added as additional information to content with the stored content number "3". Accordingly, in the case where the user views the content with the stored content number 3 again at a later time, the user can view the content with the user-specified number of display pixels.

Second Exemplary Embodiment

In a second exemplary embodiment, a method of computing the optimal number of display pixels which may be performed during the storage of content is disclosed. During the storage of content, the capacity of performing other processing is limited. Thus, a simplified method of computing the optimal number of display pixels is used. After the storage processing is completed, the method of computing the optimal number of display pixels, which is similar to that of the first exemplary embodiment, may be used.

Figure 10:
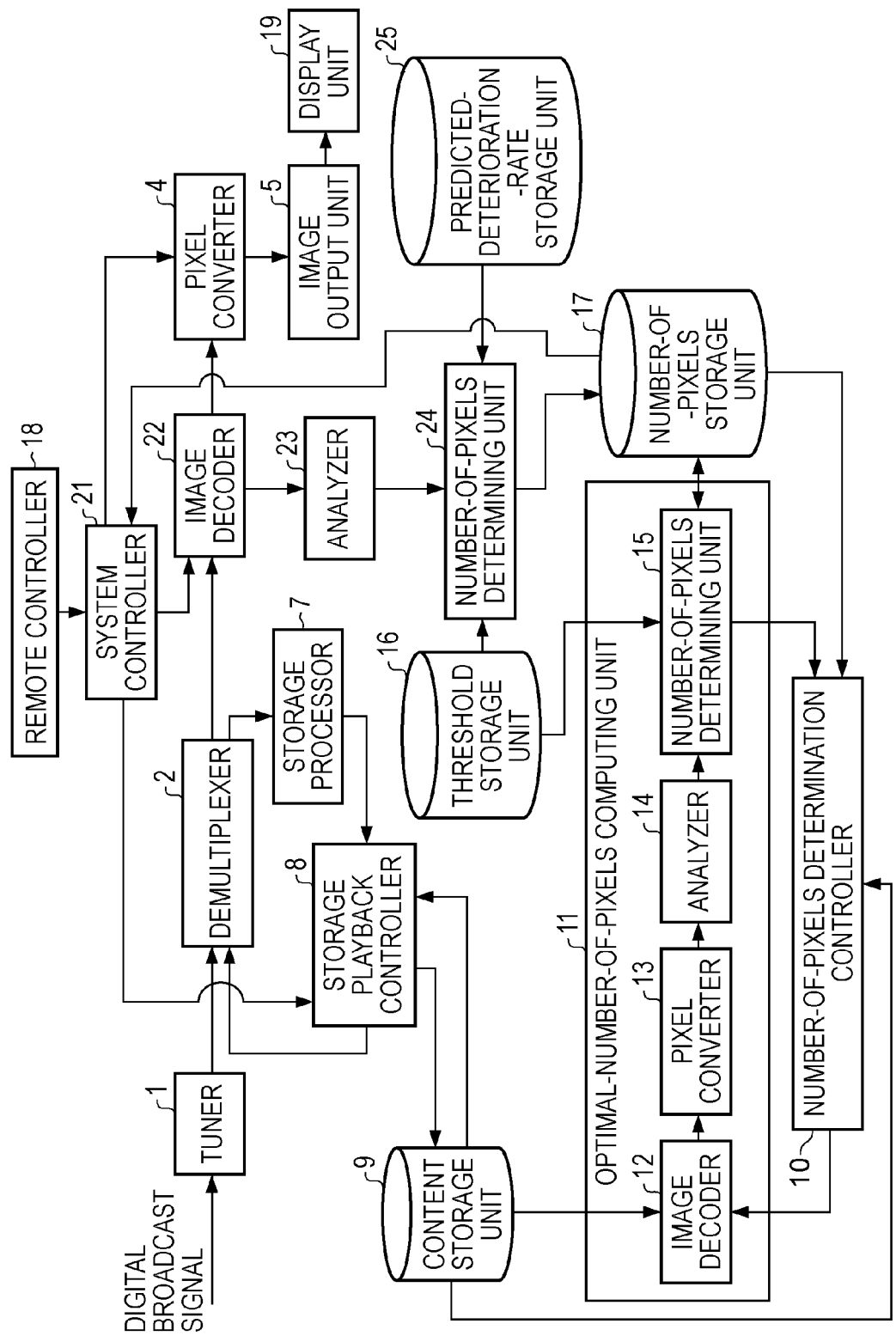
FIG. 10 is a block diagram of the schematic structure of a display control apparatus according to a second exemplary embodiment of the present invention.

FIG. 10 is a block diagram of the schematic structure of a display control apparatus according to the second exemplary embodiment of the present invention. In FIG. 10, the same reference numerals are given to blocks performing the same (or alternatively similar) operation as those shown in FIG. 1, and repeated descriptions thereof are omitted. In the second exemplary embodiment, the roles of the system controller 6 and image decoder 3 are respectively performed by a system controller 21 and an image decoder 22 as modified by the description below.

Referring to FIG. 10, upon receipt of a storage request from a user via the remote controller 18, a system controller 21 instructs the storage playback controller 8 to start the storage processing and controls the operation of an image decoder 22. In response to this, the image decoder 22 decodes an image signal supplied from the demultiplexer 2 and supplies the decoded image signal to the pixel converter 4 and an analyzer 23. The analyzer 23 sequentially decomposes images of frames of the image signal decoded by the image decoder 22 into spatial frequency components using the DCT algorithm, although other orthogonal transformation algorithms may alternatively be used. The analyzer 23 squares DCT coefficients obtained by performing the spatial frequency resolution to generate an energy histogram of each frequency component. Further, the analyzer 23 obtains the energy average and the energy standard deviation α of each frequency component from the energy histogram of each frequency component in each frame and computes (energy average+2×α) as the energy upper limit.

A predicted-deterioration-rate storage unit 25 contains pre-stored information regarding a predicted deterioration rate of image characteristics corresponding to each frequency component. This predicted-deterioration-rate information is obtained by predicting the rate of deterioration of an image. The rate of deterioration is here predicted for each frequency component, although other prediction schemes may alternatively be used in accordance with the present invention.

FIG. 11 illustrates exemplary pieces of predicted-deterioration-rate information corresponding to some of the respective frequency components at the DCT coefficient positions a11 to a88 in the DCT coefficient matrix shown in FIG. 6. The predicted deterioration rate is determined by preliminarily performing an evaluation experiment of a substantial number of images.

A number-of-pixels determining unit 24 obtains the predicted deterioration rate and the deterioration determination threshold for each frequency component respectively from the predicted-deterioration-rate storage unit 25 and the threshold storage unit 16 every time the energy average and the energy standard deviation α of each frequency component corresponding to each frame are computed by the analyzer 23 connected thereto. For all the frequency components in each frame, the number-of-pixels determining unit 24 computes the number of display pixels that satisfies the following equations (1) and (2) as the predicted optimal number of display pixels:

$$\text{energy upper limit} \times (\text{predicted deterioration rate})^i = \text{deterioration determination threshold} \quad (1)$$

$$i = \text{optimal number of display pixels} - \text{number of pixels of content} \quad (2)$$

where i computed by equation (2) represents the number of display pixels increased by performing pixel conversion. The predicted deterioration rate is obtained by predicting the rate of deterioration of image characteristics caused by increasing the number of display pixels by one display pixel.

The optimal number of display pixels (predicted value) stored in the number-of-pixels storage unit 17 is updated every time the image analysis of one frame is completed. Alternatively, instead of computing the optimal number of display pixels (predicted value) on a frame-by-frame basis for all image frames of the stored content, the optimal number of display pixels (predicted value) may be computed in units of a predetermined number of frames. Accordingly, while content is being stored, the number of display pixels that is optimal for the content (predicted value) is determined in real-time. Note that, if the computed optimal number of display pixels is greater than the number of pixels of the display, the number of pixels of the display serves as the predicted optimal number of display pixels.

After the storage of the content is completed, as has been described in the first exemplary embodiment, the optimal number of display pixels is determined by the optimal-number-of-pixels computing unit 11. As compared with the case in which the optimal number of display pixels (predicted value) is determined during the storage of the content, the optimal number of display pixels can be computed with higher accuracy after the storage of the content is completed since the image characteristics are evaluated after the image has been pixel-converted.

Figure 12:
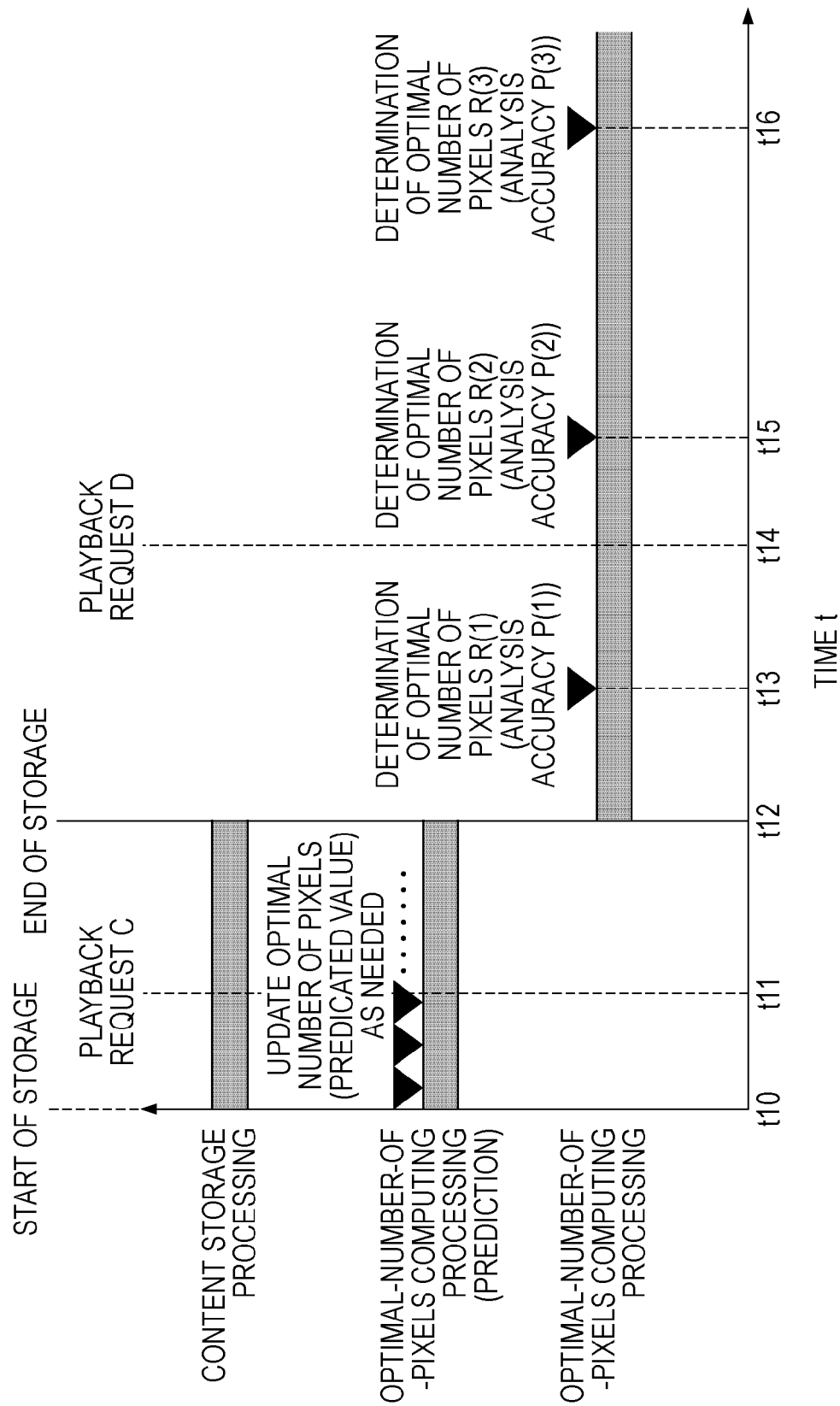
FIG. 12 is a chart for describing a process in the case where a user makes a request to play content.

FIG. 12 is a chart for describing a process where a user makes a request to play content. Referring to FIG. 12, the storage of content starts at time t10 and ends at time t12.

Referring to FIGS. 10 and 12, during the storage of the content from time t10 to time t12, the number-of-pixels determining unit 24 computes the optimal number of display pixels (predicted value) in real-time on a frame-by-frame basis. After the storage of the content is completed at time t12, the number-of-pixels determining unit 24 computes the number of display pixels R(1), R(2), R(3), . . . that is optimal for the content while increasing the analysis accuracy increment by increment in the order P(1), P(2), P(3), . . . as shown respectively at times t13, t15, t16.

When the user operates the remote controller 18 at time t11 during the storage of the content to make a request for time-shift playback of the content being stored (playback request C), the system controller 21 instructs the storage playback controller 8 to play the content. Also, the system controller 21 obtains from the number-of-pixels storage unit 17 that optimal number of display pixels (predicted value) that has been computed by that time and sets that optimal number of display pixels (predicted value) in the pixel converter 4. The content played by the storage playback controller 8 is processed by the demultiplexer 2 and image decoder 22 and then pixel-converted by the pixel converter 4 into the optimal number of display pixels (predicted value), resulting in an enlarged image that is displayed on the display unit 19. In the case where the user makes a request for time-shift playback of the content that has already been stored (playback request D) at time t14, the content is enlarged to the optimal number of display pixels R(1) computed by that time and displayed on the display unit 19.

During the storage of content, the capacity of performing other processing is limited. Thus, the optimal number of display pixels (predicted value) is computed for the image signal decoded by the image decoder 22. After the storage processing is completed, the stored content is pixel-converted, image characteristics thereof are evaluated, and the optimal number of display pixels is computed, while increasing the analysis accuracy increment by increment, using the method disclosed in the first exemplary embodiment or alternatively one similar thereto. Since the pixel conversion involves a high processing load, the optimal number of display pixels (predicted value) is computed using a method involving less processing load during the storage of the content in the present embodiment.

Although the case in which the optimal number of display pixels is computed during the storage of the content and after the storage processing is completed has been described, the present embodiment is applicable to the case in which, for example, broadcast content being received is pixel-converted in real-time, enlarged, and displayed on the display unit 19.

Third Exemplary Embodiment

According to a third exemplary embodiment, the deterioration determination thresholds for use in determining the optimal number of display pixels are changed depending on the number of pixels and the size (size of a display area) of a display unit 19A, 19B, 19C.

Figure 13:
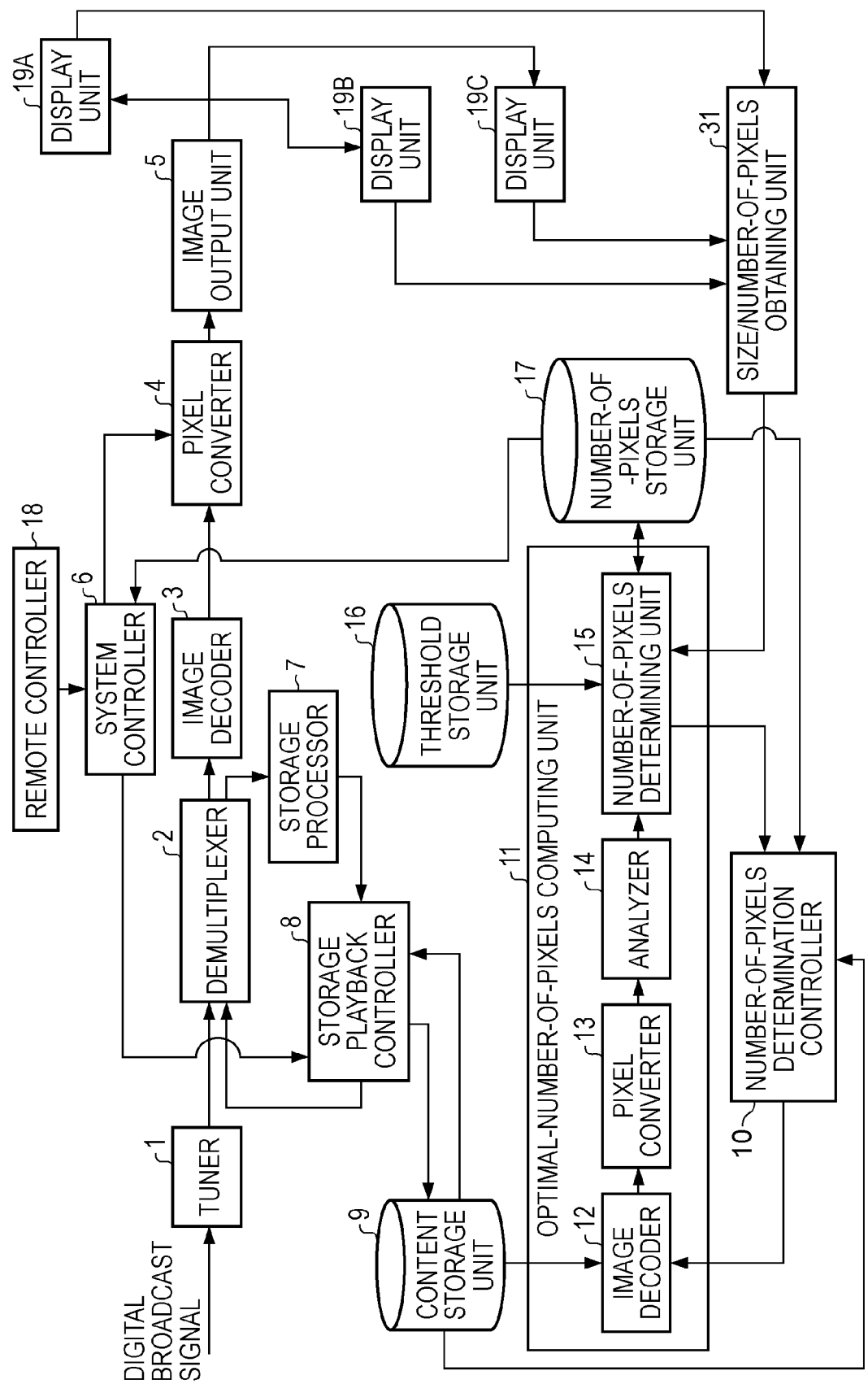
FIG. 13 is a block diagram of the schematic structure of a display control apparatus according to a third exemplary embodiment of the present invention.

FIG. 13 is a block diagram of the schematic structure of a display control apparatus according to the third exemplary embodiment of the present invention. In FIG. 13, the same reference numerals are given to blocks performing the same (or alternatively similar) operation as those shown in FIG. 1, and repeated descriptions thereof are omitted.

A size/number-of-pixels obtaining unit 31 obtains the number of pixels and the size of a display connected to the display control apparatus and outputs the obtained number of pixels and the size to the number-of-pixels determining unit 15. In this embodiment, a plurality of display units 19A, 19B, 19C are connected to the display control apparatus, and the size/number-of-pixels obtaining unit 31 obtains the number of pixels and the size of, among the plurality of display units 19A, 19B, 19C, a display unit 19X (where X can be any from A, B, and C) for displaying content. The threshold storage unit 16 contains pre-stored deterioration determination thresholds corresponding to the plurality of display units 19A, 19B, and 19C.

FIGS. 14A, 14B, and 14C illustrate exemplary deterioration determination thresholds corresponding to multiple types of display units 19A, 19B, 19C respectively. These deterioration determination thresholds may be determined in advance by performing an evaluation experiment or alternatively other similar process. Referring to FIGS. 14A, 14B, and 14C, the larger the number of pixels of a display unit, the smaller the deterioration determination thresholds. The larger the size of a display unit (length in the horizontal direction× length in the vertical direction), the larger the deterioration determination thresholds.

Referring back to FIG. 13, the number-of-pixels determining unit 15 reads from the threshold storage unit 16 the deterioration determination thresholds corresponding to the number of pixels and the size of the display unit 19X obtained by the size/number-of-pixels obtaining unit 31 and determines the optimal number of display pixels.

Even in the case where the display control apparatus is, for example, a set-top box which is not integrated with the display unit 19X, the optimal number of display pixels can be determined according to the number of pixels and the size of the display unit 19X. Even in the case where a plurality of display units 19A, 19B, 19C are connected to the display control apparatus, the process of determining the optimal number of display pixels according to the number of pixels and the size of the display unit 19X for displaying content can be appropriately performed.

Fourth Exemplary Embodiment

According to a fourth exemplary embodiment, the optimal-number-of-pixels information is inserted into a header of a compressed image signal of stored content after the optimal number of display pixels is computed. Accordingly, even when the stored content for which the optimal number of display pixels has been computed is moved to a removable medium or the like, and this stored content is played and displayed using another display control apparatus, the computed optimal number of display pixels can be reused.

Figure 15:
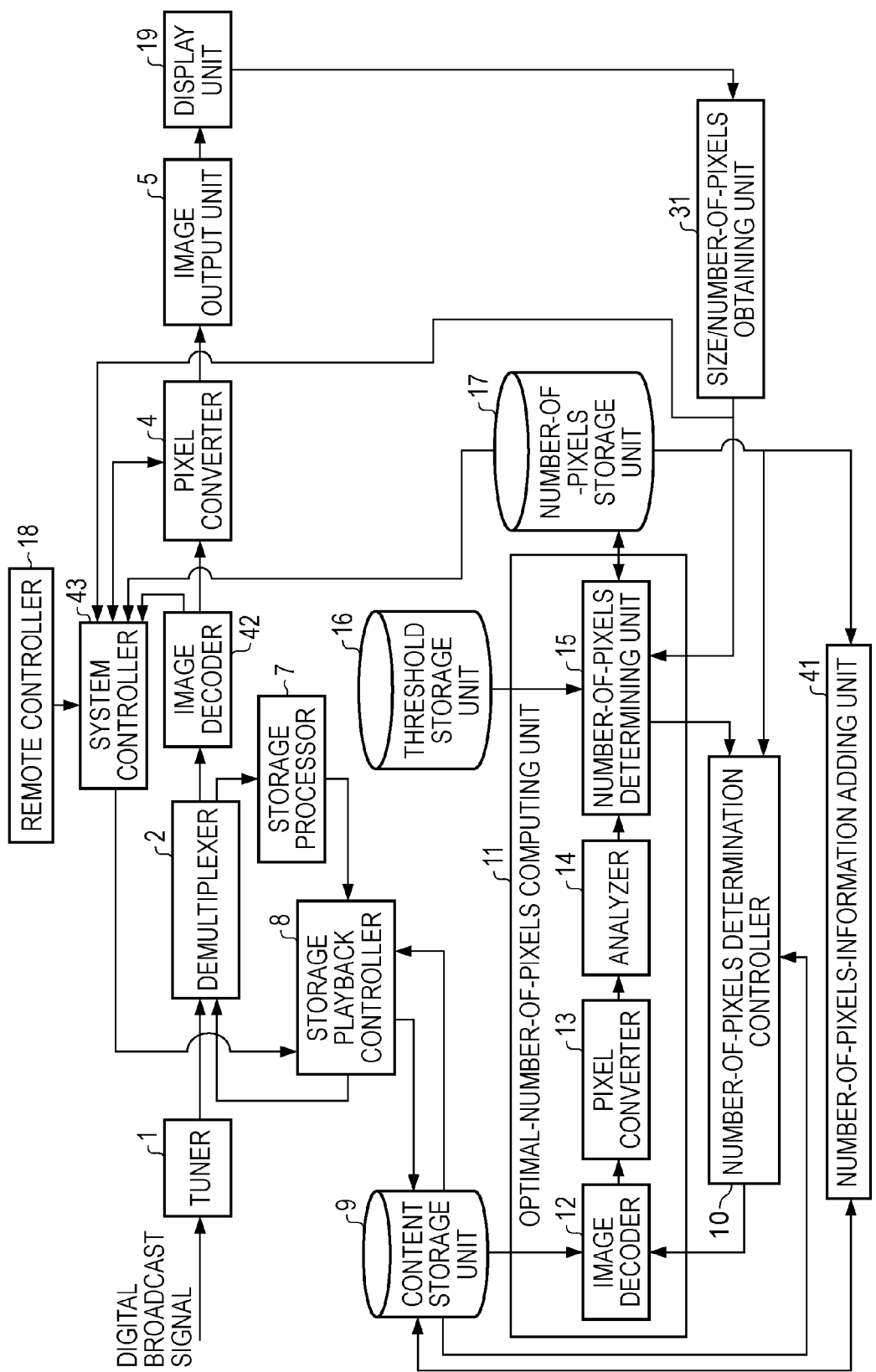
FIG. 15 is a block diagram of the schematic structure of a display control apparatus according to a fourth exemplary embodiment of the present invention.

FIG. 15 is a block diagram of the schematic structure of a display control apparatus according to the fourth exemplary embodiment of the present invention. In FIG. 15, the same reference numerals are given to blocks performing the same (or alternatively similar) operation as those shown in FIG. 13, and repeated descriptions thereof are omitted. In the fourth exemplary embodiment, the roles of the system controller 6 and image decoder 3 are respectively performed by a system controller 43 and an image decoder 42 as modified by the description below. Also, only one display unit 19 is illustrated.

A number-of-pixel-information adding unit 41 obtains the optimal number of display pixel information stored in the number-of-pixels storage unit 17, generates header information, and multiplexes the generated header information with a sequence header of an image signal (MPEG-2 video signal) separated by performing demultiplexing of content read from the content storage unit 9. The number-of-pixel-information adding unit 41 stores the MPEG-2 TS signal including the multiplexed header information in the content storage unit 9. A flag indicating whether the "optimal number of display pixel information" is added to the content stored in the content storage unit 9.

FIG. 16 illustrates exemplary header information (optimal-number-of-display-pixel information) added to content. Referring to FIG. 16, "id" is information (32 bits) indicating that this is the optimal-number-of-display-pixel header; "h_res_opt" is information (32 bits) indicating the components in the horizontal direction of the optimal number of display pixels; "v_res_opt" is information (32 bits) indicating the components in the vertical direction of the optimal number of display pixels; "h_res_monitor" is information (32 bits) indicating the components in the horizontal direction of the number of pixels of the display; "v_res_monitor" is information (32 bits) indicating the components in the vertical direction of the number of pixels of the display; "h_siz_monitor" is information (32 bits) indicating the length of the display in the horizontal direction; "v_siz_monitor" is information (32 bits) indicating the length of the display in the vertical direction; and "scaling_alg" is information (8 bits) indicating the pixel conversion algorithm. These pieces of header information are inserted into a user data area defined in the sequence header. The details of the MPEG-2 video signal and the sequence header are defined in the MPEG-2 standard International Organization for Standardization (ISO)/International Electrotechnical Commission (IEC) 13818-2, the entirety of which is hereby incorporated by reference herein.

Next, the operation of playing stored content including additional header information (optimal-number-of-display-pixel information) will now be described. Referring back to FIG. 15, content read from the content storage unit 9 is input via the demultiplexer 2 to an image decoder 42. The image decoder 42 decodes the image signal supplied via the demultiplexer 2 and checks whether the optimal number of display pixel information has been added by analyzing the sequence header of the image signal. When the optimal number of display pixel information is detected, the image decoder 42 outputs the optimal number of display pixel information (see FIG. 16) to a system controller 43.

When no optimal number of display pixel information is sent from the image decoder 42 to the system controller 43, the system controller 43 determines the optimal number of display pixels using the method described in the third exemplary embodiment and instructs the pixel converter 4 to perform pixel conversion. In contrast, when the optimal number of display pixel information is sent from the image decoder 42 to the system controller 43, the system controller 43 analyzes the optimal number of display pixel information and checks whether the pixel conversion algorithm described as part of the optimal number of display pixel information coincides with the pixel conversion algorithm of the pixel converter 4. Also, the system controller 43 checks whether the number of pixels and the size of the display, which are described as part of the optimal number of display pixel information, coincide with the number of pixels and the size of the display connected to the display control apparatus. In the case where all these checked items coincide with the corresponding above-identified items, the system controller 43 instructs the pixel converter 4 to perform pixel conversion and convert the image into the optimal number of display pixels indicated in the optimal number of display pixel information sent from the image decoder 42. In the case where at least one of the checked items does not coincide with a corresponding item, the system controller 43 determines the optimal number of display pixels using the method described in the third exemplary embodiment and instructs the pixel converter 4 to perform pixel conversion.

Therefore, even in the case where content has been moved from the display control apparatus to the content storage unit 9, the computed optimal number of display pixels can be reused.

While the present invention has been described with reference to exemplary embodiments, it is to be understood that the invention is not limited to the disclosed exemplary embodiments. For example, the method of the invention may be implemented, for example, as a program of instructions embodied on a medium readable by a machine (such as a computer or alternatively a computer assisted by components from among those described herein) and capable of causing the machine to perform an embodiment of the method. The scope of the following claims is to be accorded the broadest interpretation so as to encompass all modifications and equivalent structures and functions.

This application claims the benefit of Japanese Application No. 2007-002055 filed Jan. 10, 2007, which is hereby incorporated by reference herein in its entirety.

What is claimed is:

1. A display control apparatus for displaying on a display unit an enlarged image of video content, the display unit having a number of pixels greater than a number of pixels of the video content, the display control apparatus comprising:

an analyzer configured to analyze, by extracting a plurality of frame images from the video content which are stored in a storage and enlarging them in the horizontal direction and the vertical direction, the plurality of the enlarged images corresponding to the plurality of frame images by decomposing them and obtains image characteristics relating to the spatial frequency components;

a number-of-pixels determining unit configured to determine a number of display pixels of the enlarged image so that the degree of deterioration of the image characteristic relating to the spatial frequency components analyzed by the analyzer satisfies a predetermined deterioration determination criterion; and a pixel converter configured to perform pixel conversion of the image of the video content to generate the enlarged image, the enlarged image having the number of display pixels determined by the number-of-pixels determining unit, and to output the enlarged image to the display unit; and a controller configured to control storage and playback of the video content, wherein the analyzer repeats the analyzing process of the image characteristic of the enlarged image which is enlarged in the horizontal direction and the vertical direction by incrementally increasing analysis accuracy, by increasing the number of the frame images for analyzing in accordance with the time course, wherein the number-of-pixels determining unit sequentially determines the number of display pixels corresponding to the analysis accuracy at each increment so that the degree of deterioration of the image characteristic analyzed by the analyzer satisfies the predetermined deterioration determination criterion, and wherein, upon receipt of an instruction to play the stored video content, the controller controls the pixel converter to convert the number of pixels of the video content into the number of display pixels determined by the number-of-pixels determining unit at the time the instruction has been received.

2. The display control apparatus according to claim 1, wherein, by incrementally decreasing the number of display pixels of the enlarged images within a range of less or equal to the number of pixels of the display unit to equal to or larger than the number of pixels of the video contents, the number of pixels determining unit determines the number of display pixels of which the deterioration of the image characteristic satisfies a predetermined deterioration determination criterion.

3. The display control apparatus according to claim 1, wherein the predetermined deterioration determination criterion depends on the number of pixels of the display unit.

4. The display control apparatus according to claim 1, wherein the predetermined deterioration determination criterion depends on a size of a display area of the display unit.

5. The display control apparatus according to claim 1, further comprising:
a storage unit configured to store the video content; and
an adding unit configured to add information indicating the number of display pixels determined by the number-of-pixels determining unit to the video content stored in the storage unit.

6. A display control method of displaying on a display unit an enlarged image of video content, the display unit having a number of pixels greater than a number of pixels of the video content, the display control method comprising:

analyzing, by extracting a plurality of frame images from the video content which are stored in a storage and enlarging them in the horizontal direction and the vertical direction, the plurality of the enlarged images corresponding to the plurality of frame images by decomposing them, and obtaining image characteristics relating to the spatial frequency components;

determining a number of display pixels of the enlarged image so that the degree of deterioration of the image characteristic relating to the spatial frequency components satisfies a predetermined deterioration determination criterion;

performing pixel conversion of the image of the video content to generate the enlarged image, the enlarged image having the number of display pixels, and outputting the enlarged image to the display unit; and controlling storage and playback of the video content, wherein the analyzing of the image characteristic of the enlarged image which is enlarged in the horizontal direction and the vertical direction is repeated by incrementally increasing analysis accuracy, by increasing the number of the frame images for analyzing in accordance with the time course, wherein the determining sequentially determines the number of display pixels corresponding to the analysis accuracy at each increment so that the degree of deterioration of the image characteristic satisfies the predetermined deterioration determination criterion, and wherein, upon receipt of an instruction to play the stored video content, the controlling controls the pixel conversion to convert the number of pixels of the video content into the number of display pixels determined by the determining at the time the instruction has been received.

7. The display control method according to claim 6, wherein, by incrementally decreasing the number of display pixels of the enlarged images within a range of less or equal to the number of pixels of the display unit to equal to or larger than the number of pixels of the video contents, the determining determines the number of display pixels of which the deterioration of the image characteristic satisfies a predetermined deterioration determination criterion.

8. The display control method according to claim 6, wherein the predetermined deterioration determination criterion depends on the number of pixels of the display unit.

9. The display control method according to claim 6, wherein the predetermined deterioration determination criterion depends on a size of a display area of the display unit.

10. The display control method according to claim 6, further comprising:
storing the video content; and
adding information indicating the number of display pixels to the video content stored.

* * * * *